United States Patent
Masuyama et al.

(10) Patent No.: US 6,397,347 B1
(45) Date of Patent: May 28, 2002

(54) DISK ARRAY APPARATUS CAPABLE OF DEALING WITH AN ABNORMALITY OCCURRING IN ONE OF DISK UNITS WITHOUT DELAYING OPERATION OF THE APPARATUS

(75) Inventors: Yasuhiro Masuyama; Masanobu Akagi; Fumio Ichikawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/258,126

(22) Filed: Feb. 26, 1999

(30) Foreign Application Priority Data

Feb. 26, 1998 (JP) ............................................ 10-044844
Jan. 12, 1999 (JP) ........................................ 11-014325

(51) Int. Cl.$^7$ ............................................... G06F 11/00
(52) U.S. Cl. ............................... 714/5; 714/6; 711/114
(58) Field of Search .............................. 714/2, 5, 6, 15, 714/42, 746; 711/114, 162; 360/53, 77.04; 369/32, 53.1

(56) References Cited

U.S. PATENT DOCUMENTS

| | | | |
|---|---|---|---|
| 5,521,893 A | * | 5/1996 | Yamasaki et al. |
| 5,612,933 A | * | 3/1997 | Iso et al. |
| 5,655,150 A | * | 8/1997 | Matsumoto et al. |
| 5,812,761 A | | 9/1998 | Seki et al. ............. 395/185.07 |
| 5,835,703 A | * | 11/1998 | Konno |
| 5,895,438 A | * | 4/1999 | Yomtoubian |

FOREIGN PATENT DOCUMENTS

| | | |
|---|---|---|
| JP | 6-35625 | 2/1994 |
| JP | 9-167427 | 6/1997 |

* cited by examiner

Primary Examiner—Gopal C. Ray
(74) Attorney, Agent, or Firm—Foley & Lardner (57) ABSTRACT

In a disk array apparatus which includes disk units so as to have a redundancy and which carries out, in response to a data writing instruction or a data reading instruction from a host computer, a data writing operation or a data reading operation between the disk units and the host computer, detector/memory section (211) detects, as a faulty unit, one of the disk units in which an abnormality occurs on any one of the data writing operation and the data reading operation. A disconnection managing section (212a) temporarily disconnects the faulty unit as a temporarily disconnected unit to make the disk array apparatus operate in a temporary degenerate mode. An instruction-execution controlling section (212) forces the disk units except the temporarily disconnected unit to execute the data writing operation or the reading operation between the disk units except the temporarily disconnected unit and the host computer by the use of the redundancy when the disk array apparatus receives, during the temporary degenerate mode, the data writing instruction or the data reading instruction from the host computer. A retry section (212c) carries out retry for the temporarily disconnected unit in parallel to the data writing operation or the data reading operation executed between the disk units except the temporarily disconnected unit and the host computer.

24 Claims, 11 Drawing Sheets

DISK ARRAY APPARATUS CAPABLE OF DEALING WITH AN ABNORMALITY OCCURRING IN ONE OF DISK UNITS WITHOUT DELAYING OPERATION OF THE APPARATUS

BACKGROUND OF THE INVENTION

This invention relates to a disk array apparatus used as a data storage (or a data memory) in an information processing apparatus. This invention relates also to an abnormality or error control method for use in the disk array apparatus and to a recording medium memorizing a control program for executing the abnormality control method.

In recent years, the disk array apparatus which comprises a plurality of disk units, such as hard-disk units (namely, hard-disk storages) has widely come into use for recording data together with redundant data as parity data. Such a structure of the disk array apparatus is known as a RAID (Redundant Array of Inexpensive Disks) configuration. If any abnormality such as a read-error happens in one of the disks units, the data can be reconstructed by the data read from the remaining disk units. Thus, the disk array apparatus is highly reliable as a data storage (or a data memory).

In the meanwhile, a disk unit recently used is much increased in recording density. In such a disk unit, presence of a very small flaw or crack on a recording medium may possibly cause the read-error. Upon occurrence of the read-error, retry (may also be called internal retry) of a data writing operation or a data reading operation is generally executed within the disk unit. The probability of occurrence of the read-error is more and more increased following the increase in recording density of the disk unit so that execution of such retry becomes more and more frequent. The retry typically requires several seconds. Sometimes, the read-error can not be recovered by the retry and the data writing operation or the data reading operation is completely impossible. In this event, maintenance work is required to exchange or repair the disk unit.

In view of the above, the disk array apparatus currently used in ordinary data processing waits for completion of the retry in the disk unit. If the retry is successful and the abnormality is recovered, the ordinary data processing is continued. On the contrary, if the data reading operation or the data writing operation is still impossible on the retry, the disk unit is disconnected as a faulty disk unit and the disk array apparatus is operated in a degenerate mode.

However, the disk unit recently available tends to require a long time for the retry because of the high recording density. This brings about a delay in an original or primary operation of the disk unit, i.e., data input/output between the disk unit and a host computer. Taking this into account, proposal is made of an approach in which any disk unit with the abnormality occurring therein is disconnected from the disk array apparatus as a faulty disk unit and the disk array apparatus is operated in the degenerate mode as far as the retry is not completed within a predetermined time period as a retry period.

In case where the disk array apparatus is used as a motion picture storage, a latency or waiting time between issuance of a data writing instruction or a data reading instruction and completion of data transfer is very short. This is because motion pictures are continuously recorded and reproduced. In this event, the retry period of a sufficient length can not be reserved. As far as the retry period is restricted within such a very short latency, the retry is often unsuccessful so that the disk unit is disconnected as a faulty disk unit and the disk array apparatus is operated in the degenerate mode.

Thus, in the above-mentioned approach in which the retry period is restricted, the disk unit is often judged as a faulty unit and disconnected from the disk array apparatus although the disk unit might be in fact normal. In other words, if the retry period was sufficiently long, the data writing operation or the data reading operation would have been successful. It is unfavorable that the disk unit which is in fact normal is disconnected and subjected to maintenance work such as repair and exchange.

During the degenerate mode, the disk array apparatus has no redundancy. If another error is happens in a different position or a different disk unit, it is highly possible that the data writing operation or the reading operation becomes impossible. Thus, disconnection of any disk unit in which the retry is not successful within the predetermined time period is unfavorable because probability of operation in the degenerate mode is increased and the reliability as the data storage is decreased.

SUMMARY OF THE INVENTION

It is therefore an object of this invention to provide a disk array apparatus which is capable of dealing with an abnormality such as a write-error or a read-error without delaying an original or primary operation of the disk array apparatus and which is prevented from being undesiredly operated in a degenerate mode by disconnecting a disk unit from the disk array apparatus which disk unit is temporarily faulty but is in fact normal.

It is another object of this invention to provide an abnormality control method for dealing with an abnormality in the above-mentioned disk array apparatus.

It is still another object of this invention to provide a recording medium which stores a program for executing the above-mentioned abnormality control method.

A disk array apparatus to which this invention is applicable comprises a plurality of disk units so as to have a redundancy and carries out, in response to a data writing instruction or a data reading instruction from a host computer, a data writing operation or a data reading operation between the disk units of the disk array apparatus and the host computer in a normal mode.

According to this invention, the disk array apparatus comprises: detecting means for detecting, as a faulty unit, one of the disk units in which an abnormality occurs on the data writing operation and the data reading operation; memorizing means for memorizing information indicative of the faulty unit; disconnection managing means for managing disconnection of the faulty unit by temporarily disconnecting the faulty unit from the disk array apparatus as a temporarily disconnected unit to make the disk array apparatus operate in a temporary degenerate mode; instruction-execution controlling means for controlling instruction-execution to force the disk units except the temporarily disconnected unit to execute the data writing operation or the reading operation between the disk units except the temporarily disconnected unit and the host computer by the use of the redundancy when the disk array apparatus receives, during the temporary degenerate mode, the data writing instruction or the data reading instruction from the host computer; and retry means for carrying out retry for the temporarily disconnected unit in parallel to the data writing operation or the data reading operation executed between the disk units except the temporarily disconnected unit and the host computer.

An abnormality control method to which this invention is applicable is for use in a disk array apparatus which comprises a plurality of disk units so as to have a redundancy and which carries out, in response to a data writing instruction or a data reading instruction from a host computer, a data writing operation or a data reading operation between the disk units of the disk array apparatus and the host computer in a normal mode.

According to an aspect of this invention, the abnormality control method comprises: a detecting step of detecting, as a faulty unit, one of the disk units in which an abnormality occurs on the data writing operation or the data reading operation; a memorizing step of memorizing information indicative of the faulty unit; a disconnection managing step of managing disconnection of the faulty unit by temporarily disconnecting the faulty unit from the disk array apparatus as a temporarily disconnected unit to make the disk array apparatus operate in a temporary degenerate mode; an instruction-execution controlling step of controlling instruction-execution to force the disk units except the temporarily disconnected unit to execute the data writing operation or the reading operation between the disk units except the temporarily disconnected unit and the host computer by the use of the redundancy when the disk array apparatus receives, during the temporary degenerate mode, the data writing instruction or the data reading instruction from the host computer; and a retry step of carrying out retry for the temporarily disconnected unit in parallel to the data writing operation or the data reading operation executed between the disk units except the temporarily disconnected unit and the host computer.

According to another aspect of this invention, the abnormality control method comprises the steps of: making when an abnormality occurs in a particular unit of the disk units, the disk array apparatus operate temporarily in a temporary degenerate mode due to the disk units except the particular unit, and carrying out retry for the particular unit while the disk array apparatus operates in the temporary degenerate mode due to the disk units except the particular unit.

According to still another aspect of this invention, there is provided a recording medium which records a control program for executing the abnormality control method.

DESCRIPTION OF PREFERRED EMBODIMENTS

Now, description will be made about a disk array apparatus and an error control method according to this invention.

The disk array apparatus according to this invention comprises a plurality of disk units including at least one redundant disk unit. The disk array apparatus is supplied from a host computer with a data writing instruction or a reading instruction. When the data writing instruction is supplied from the host computer together with writing data, redundant data are added to the writing data in the disk array apparatus. The writing data with the redundant data added thereto are distributed to the disk units to be written therein as distributed data. When the reading instruction is received, the disk array apparatus assembles the distributed data into reading data and delivers the reading data to the host computer.

As a special structure of the disk array apparatus, same data are simultaneously written in a plurality of disk units and read from one of the disk units. Such a structure is known as a RAID-1 (Redundant Array of Inexpensive Disks-1) configuration.

In any event, the disk array apparatus of this invention has a structure such that, if an abnormality or an error occurs in one of the disk units which will be referred to as a faulty disk unit, a part of the distributed data stored in the faulty disk unit is correctly reconstructed by the use of the remaining part of the distributed data, including the redundant data, stored in the remaining disk units.

It is assumed that, in the disk array apparatus of the above-mentioned structure, occurrence of the abnormality is detected on a data writing operation or a data reading operation responsive to the data writing instruction or the data reading instruction from the host computer. Specifically, occurrence of the abnormality is informed from a particular one of the disk units. Alternatively, a timeout event such that no response is returned from the particular disk unit within a predetermined time period is detected. In this case, the particular disk unit is temporarily disconnected from the disk array apparatus as a faulty disk unit and the disk array apparatus is operated in a temporary degenerate mode. The particular disk unit temporarily disconnected as a faulty disk unit may be called to temporarily degenerated disk unit.

During the temporary degenerate mode with the faulty disk unit temporarily disconnected from the disk array apparatus, a data reconstructing mechanism is activated to produce reconstruction data which are sent to the host computer. Thus, the reading operation responsive to the reading instruction is normally completed. Simultaneously, the faulty disk unit temporarily disconnected from the disk array apparatus is subjected to the following operations (1) through (3).

(1) The reading operation in which the abnormality has occurred is executed again to confirm whether or not the abnormality again occurs. If no abnormality occurs, occurrence of the abnormality is simply recorded without carrying out any further special processing.

(2) Stored data stored at a position where the abnormality has occurred are rewritten to recover a position where the stored data can be normally read.

(3) If the abnormality is a read-error resulting from a local physical defect of a medium, the use of a defective position is inhibited and an alternate position is assigned. This operation is called reassignment.

Thereafter, the temporary degenerate mode is cancelled to return the disk array apparatus into a normal mode. It is noted here that the above-mentioned operations for the faulty disk unit temporarily disconnected are carried out in parallel to execution of the instruction from the host computer.

In case where a new reading instruction is supplied from the host computer during the temporary degenerate mode, the disk array apparatus obtains the reading data by means of the data reconstructing mechanism (data reconstruction using the remaining disk units) and delivers the reading data to the host computer with the faulty disk unit temporarily disconnected.

In case where a new writing instruction is supplied from the host computer during the temporary degenerate mode, the disk array apparatus writes new writing data and new redundant data into the remaining disk units with the faulty disk unit temporarily disconnected. Simultaneously, write positions where the new writing data together with the new redundant data are written in the remaining disks units as stored data are successively memorized as block addresses. When internal processing such as the above-mentioned reassignment is completed for the faculty disk unit temporarily disconnected and the faulty disk unit is restored into a restored disk unit, the new writing data to be written into the restored disk unit is reconstructed from the stored data in the remaining disk units and then written into the restored disk unit at positions corresponding to the above-mentioned block addresses. Thereafter, the temporary degenerate mode is cancelled to return the disk array apparatus into the normal mode.

Thus, the disk array apparatus tries to go out of degenerate mode which lasts for a long period of time. In other words, even if another abnormality occurs before completion of the data reconstruction, it is possible to reduce the risk of the reading operation becoming impossible and to continue a stable operation.

Now, several preferred embodiments will be described with reference to the drawing.

First Embodiment

Figure 1:
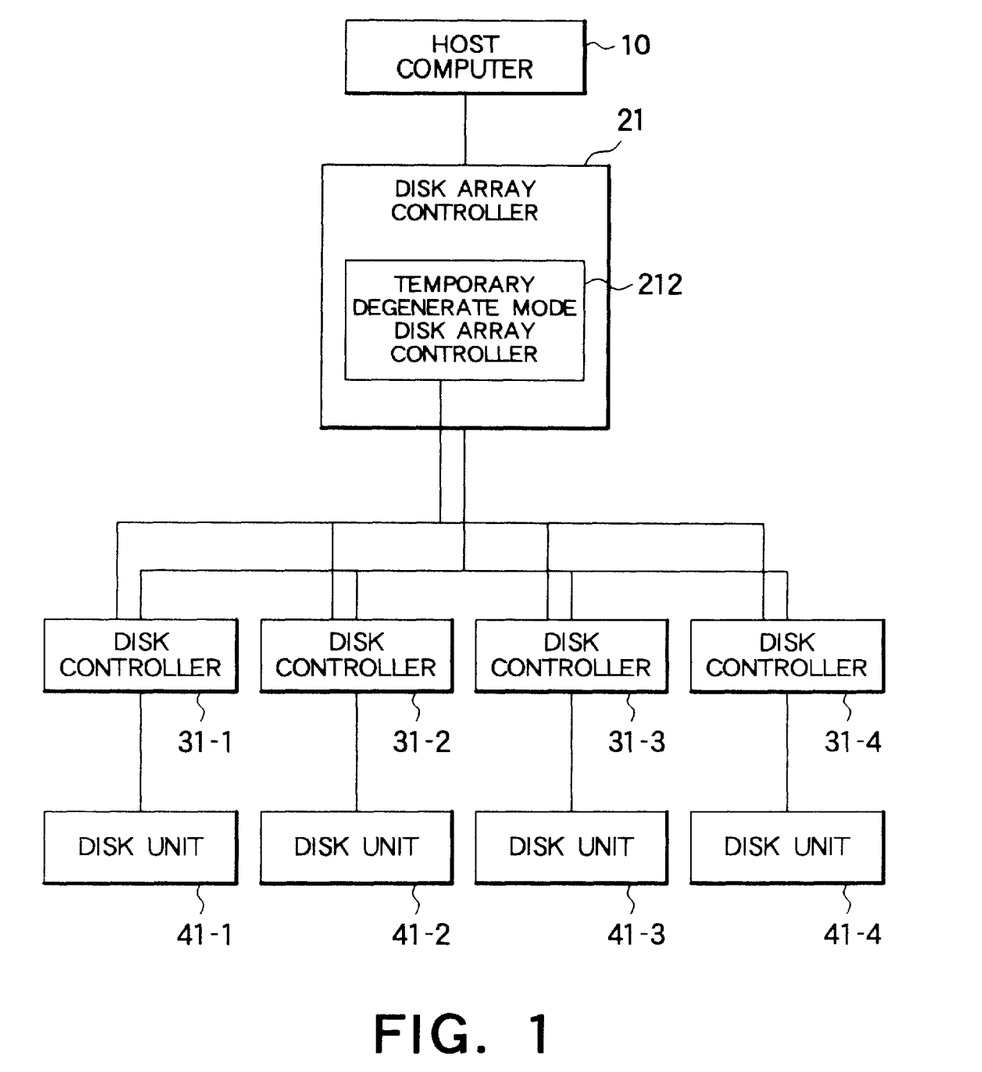
FIG. 1 is a block diagram of a disk array apparatus according to a first embodiment of this invention.

Referring to FIG. 1, a disk array apparatus according to a first embodiment of this invention comprises a disk array controller 21, first through fourth disk controllers 31-1 through 31-4, and first through fourth disk units 41-1 through 41-4. The disk array apparatus has a RAID-3 (Redundant Array of Inexpensive Disks-3) configuration and the first through the fourth disk units 41-1 through 41-4 are arranged to have a redundancy. The disk array apparatus is responsive to a data writing instruction (or a write instruction) or a data reading instruction (or a read instruction) from a host computer 10 and executes a data writing operation or a data reading operation in response to the write instruction or the read instruction. Although the disk array apparatus being illustrated comprises the four disk units 41-1 through 41-4, three disk units or five or more disk units may be used.

Figure 2:
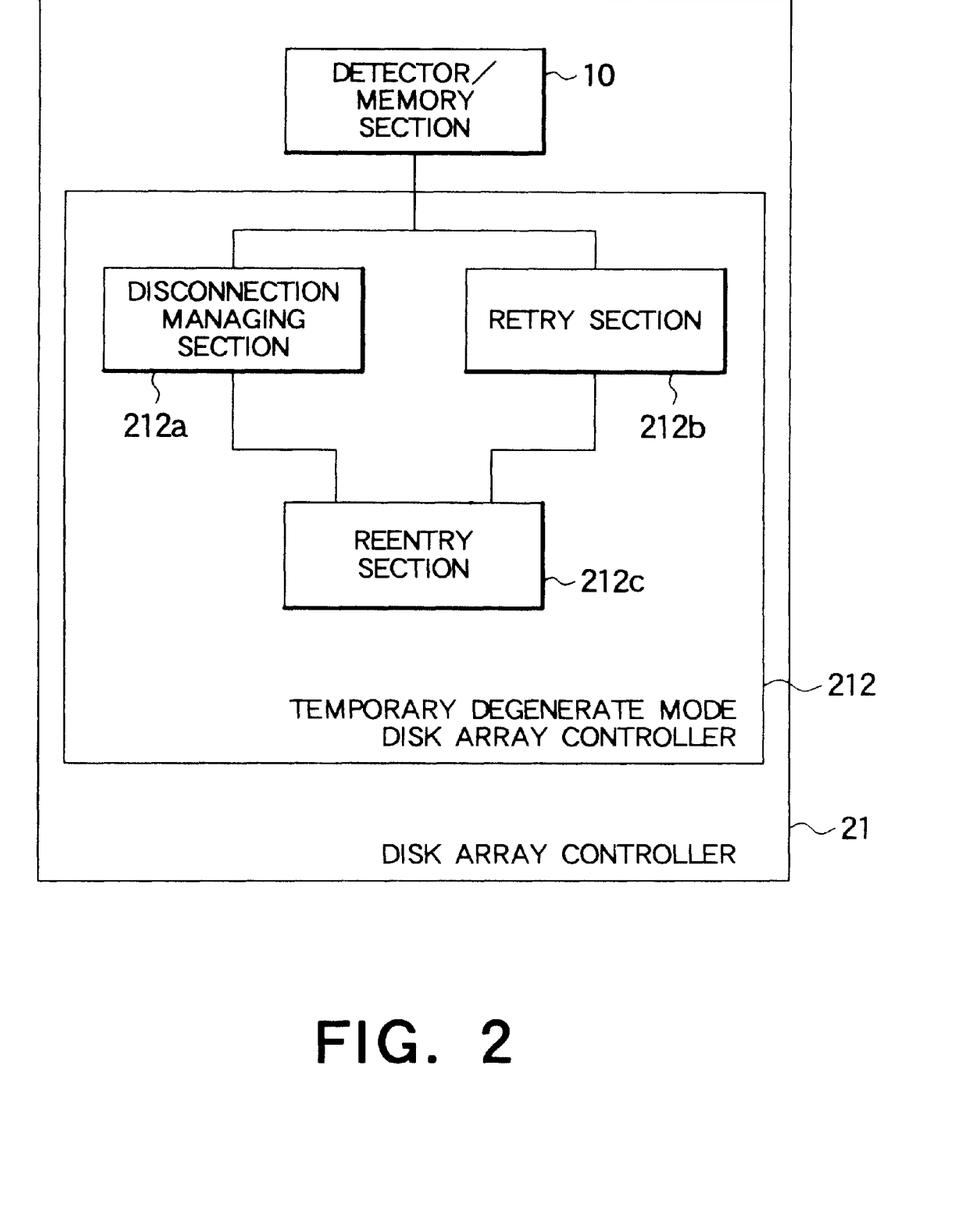
FIG. 2 is a block diagram of a disk array controller in the disk array illustrated in FIG. 1.

Next referring to FIG. 2, the disk array controller 21 comprises a detector/memory section 211 and a temporary degenerate mode disk array controller 212. The temporary degenerate mode disk array controller 212 comprises a disconnection managing section 212a, a retry section 212b, and a reentry section 212c. The reentry section 212c serves to carry out reentry of a disk unit temporarily disconnected.

Referring to FIGS. 1 and 2, the disk array controller 21 decodes an instruction from the host computer 10.

When the instruction is a writing instruction, the disk array controller 21 distributes write data supplied from the host computer 10 and redundant data to the first through the fourth disk controllers 31-1 through 31-4. Under controller of the first through the fourth disk controllers 31-1 through 31-4, the write data and the redundant data are written into the first through the fourth disk units 41-1 through 41-4 as stored data, respectively.

On the other hand, when the instruction is a reading instruction, the first through the fourth disk controllers 31-1 through 31-4 read the stored data from the first through the fourth disk units 41-1 through 41-4, respectively, and deliver the stored data to the disk array controller 21. The disk array controller 21 assembles the stored data into read data as a reproduction of the write data and delivers the read data to the host computer 10.

Upon detection of occurrence of an abnormality or an error in a particular one of the first through the fourth disk units 41-1 through 41-4 during a writing operation responsive to the write instruction, the detector/memory section 211 of the disk array controller 21 memorizes faulty unit information representative of the particular disk unit. Simultaneously, the detector/memory section 211 delivers the faulty unit information to the disconnection managing section 212a of the temporary degenerate mode disk array controller 212. The disconnection managing section 212a temporarily disconnects from the disk array apparatus the particular disk unit as a faulty disk unit and makes the disk array apparatus operate in a temporary degenerate mode. The disk array controller 21 continues the writing operation upon the remaining disk units.

Supplied with the faulty unit information from the detector/memory section 211 of the disk array controller 21, the retry section 212b of the temporary degenerate mode disk array controller 212 executes the following operations (1) through (3) upon the faulty disk unit in parallel to the writing operation of the disk array controller 21.

(1) The writing operation in which the abnormality has occurred is executed again to confirm whether or not a similar abnormality occurs. If no similar abnormality occurs, occurrence of the abnormality is simply recorded without carrying out any further special processing.

(2) Stored data stored at a position where the abnormality has occurred are rewritten to recover a state such that the stored data can be normally read.

(3) The use of a faulty position is inhibited and an alternate position is assigned as internal processing. This operation is called reassignment.

On the other hand, upon detection of occurrence of an abnormality or an error in a particular one of the first through the fourth disk units 41-1 through 41-4 during a reading operation responsive to the reading instruction, the detector/memory section 211 of the disk array controller 21 memorizes faulty unit information representative of the particular disk unit. Simultaneously, the detector/memory section 211 delivers the faulty unit information to the disconnection managing section 212a of the temporary degenerate mode disk array controller 212. The disconnection managing section 212a temporarily disconnects from the disk array apparatus the particular disk unit as a faulty disk unit and makes the disk array apparatus operate in a temporary degenerate mode. The disk array controller 21 continues the reading operation upon the remaining disk units.

Supplied with the faulty unit information from the detector/memory section 211 of the disk array controller 21, the retry section 212b of the temporary degenerate mode disk array controller 212 executes the following operations (1) through (3) upon the faulty disk unit in parallel to the reading operation of the disk array controller 21.

(1) The reading operation in which the abnormality has occurred is executed again to confirm whether or not a similar abnormality occurs. If no similar abnormality occurs, occurrence of the abnormality is simply recorded without carrying out any further special processing.

(2) Stored data stored at a position where the abnormality has occurred are rewritten to recover a state such that the stored data can be normally read.

(3) The use of a faulty position is inhibited and an alternate position is assigned as internal processing. This operation is called reassignment.

When a next instruction is supplied from the host computer 10 before completion of the internal processing upon the faulty disk unit by the temporary degenerate mode disk array controller 212, the disk array controller 21 executes an appropriate operation corresponding to the next instruction. If the next instruction is a new writing instruction, write positions are memorized in a memory (not shown) as block addresses.

When the internal processing of the faulty disk unit by the temporary degenerate mode disk array controller 212 is completed and the faulty disk unit is restored as a restored disk unit, the disk array controller 21 reconstructs a part of new write data to be written in the restored disk unit by the help of the remaining disk units, and then writes the new write data into the restored disk unit at positions corresponding to the block addresses memorized in the memory of the disk array controller 21. Thereafter, the reentry section 212c of the disk array controller 21 cancels the temporary degenerate mode to return the disk array apparatus into a normal mode.

Figure 3:
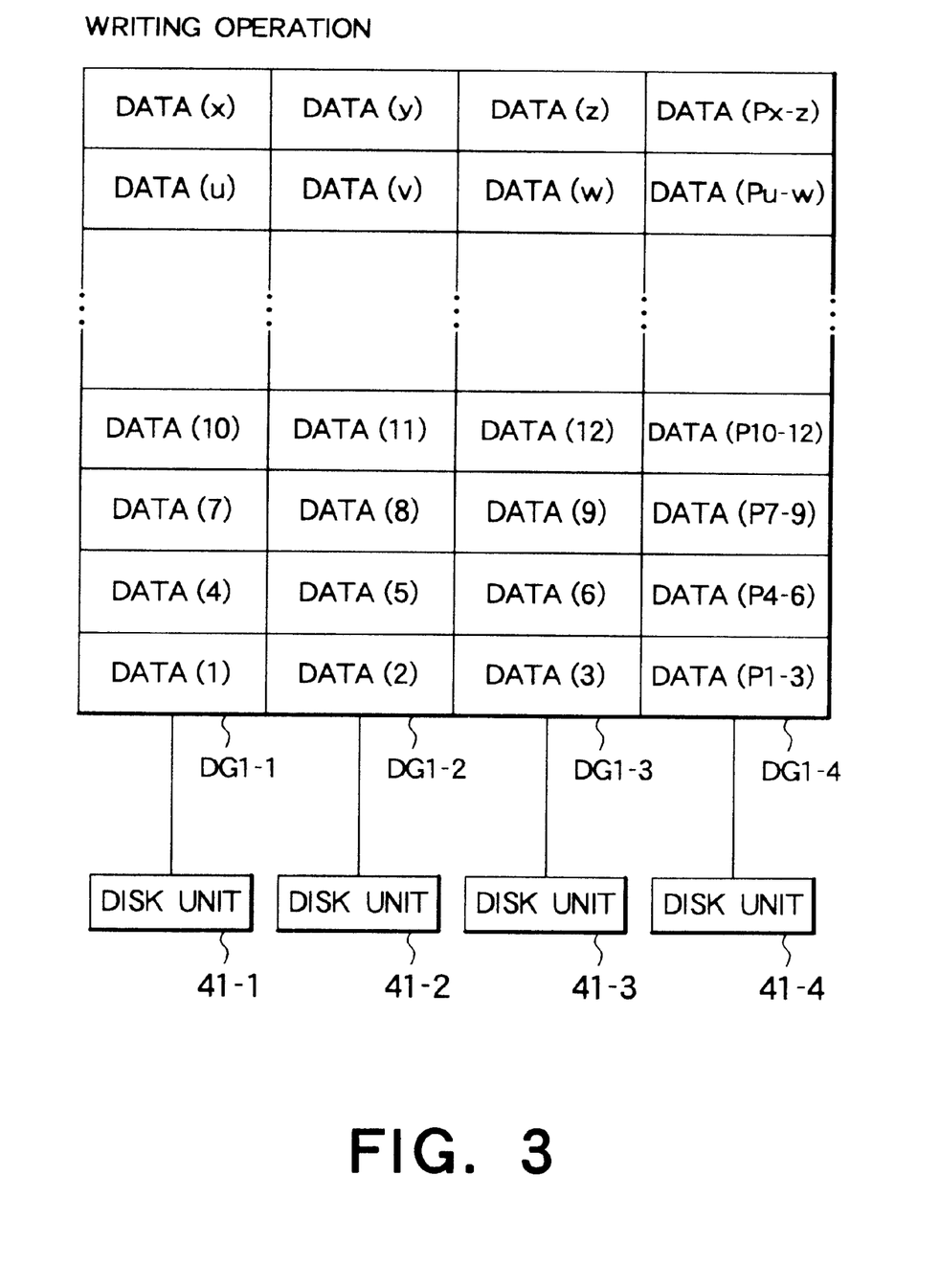
FIG. 3 is a view for describing data preparation during a data writing operation in the disk array apparatus illustrated in FIG. 1.

Referring to FIG. 3 in addition to FIG. 1, data preparation in the writing operation will be described.

When the disk array apparatus is supplied from the host computer 10 with the writing instruction, the disk array controller 21 distributes the write data (1) through (z) from the host computer 10 into first through third data groups DG1-1 through DG1-3 and prepares parity data (P1-3), (P4-6), (P7-9), (P10-12), . . . , (Pu-w), and (Px-z) as a fourth data group DG1-4. The write data and the parity data are supplied to the first through the fourth disk controllers 31-1 through 31-4 in the following manner. Under control of the first disk controller 31-1, the first data group DG1-1 ((1), (4), (7), (10), . . . , (u), and (x)) is written into the first disk unit 41-1. Under control of the second disk controller 31-2, the second data group DG1-2 ((2), (5), (8), (11), . . . , (v), and (y)) is written into the second disk unit 41-2. Under control of the third disk controller 31-3, the third data group DG1-3 ((3), (6), (9), (12), . . . , (w), and (z)) is written into the third disk unit 41-3. Under control of the fourth disk controller 31-4, the fourth data group DG1-4 ((P1-3), (P4-6), (P7-9), (P10-12), . . . , (Pu-w), and (Px-z)) as the parity data is written into the fourth disk unit 41-4.

It is noted here that the write data (1), (2), and (3) and the parity data (P1-3) are written in the first through the fourth disk units 41-1 through 41-4 at write positions having a first common block address. Likewise, the write data (4), (5), and (6), and the parity data (P4-6) are written at a second common block address. Subsequently, the write data are similarly written. Finally, the write data (x), (y), and (z) and the parity data (Px-z) are written at a final common block address.

By the use of the parity data (P1-3), (P4-6), (P7-9), (P10-12), . . . , (Pu-w), and (Px-z), it is possible to perform the data reconstruction for an abnormality occurring in one of a pair of the first disk controller 31-1 and the first disk unit 41-1, a second pair of the second disk controller 31-2 and the second disk unit 41-2, a third pair of the third disk controller 31-3 and the third disk unit 41-3, and a fourth pair of the fourth disk controller 31-4 and the fourth disk unit 41-4.

Figure 4:
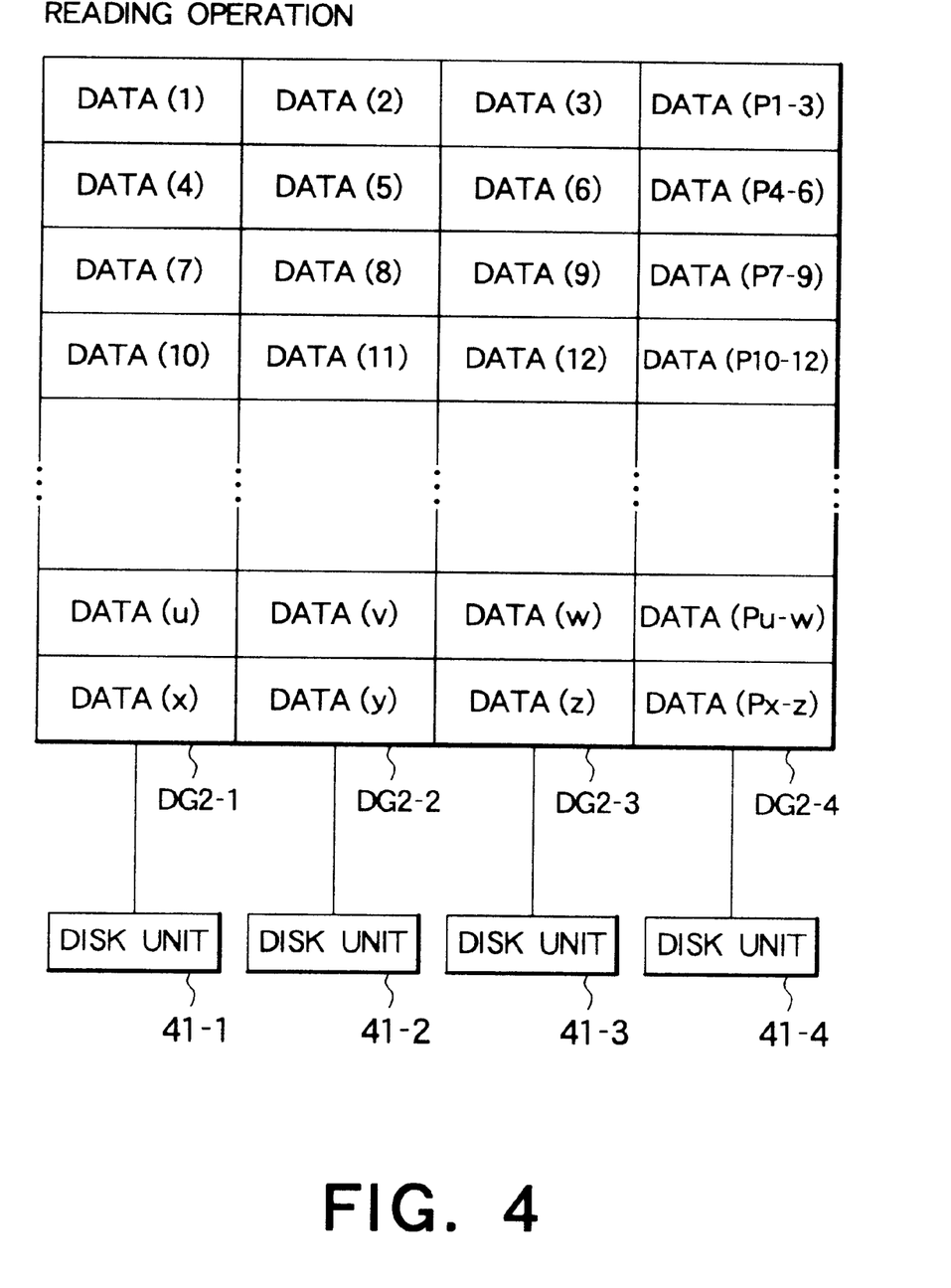
FIG. 4 is a view for describing data reproduction during a data reading operation in the disk array apparatus illustrated in FIG. 1.

Referring to FIG. 4 in addition to FIG. 1, data reproduction in the reading operation will be described.

When the disk array apparatus is supplied with the reading instruction from the host computer 10, the first through the fourth disk controllers 31-1 through 31-4 obtain first through fourth data groups DG2-1 through DG2-4 from the first through the fourth disk units 41-1 through 41-4, respectively, and deliver the first through the fourth data groups DG2-1 through DG2-4 to the disk array controller 21. The disk array controller 21 rearrange the first through the fourth data groups DG2-1 through DG2-4 into the read data (1) through (z) and delivers the read data to the host computer 10.

Specifically, the first data group DG2-1 ((1), (4), (7), (10), . . . , (u), and (x)) is read from the first disk unit 41-1. The second data group DG2-2 ((2), (5), (8), (11), . . . , (v) and (y)) is read from the second disk unit 41-2. The third data group DG2-3 ((3), (6), (9), (12), . . . , (w), and (z)) is read from the third disk unit 41-3. These data groups are rearranged into the read data (1) through (z) by the disk array controller 21. In order to perform the data reconstruction for an abnormality in one of the above-mentioned first through the fourth pairs of the disk controllers and the disk units, the fourth data group DG2-4 ((P1-3), (P4-6), (P7-9), (P10-12), . . . , (Pu-w), and (Px-z)) as parity data is read from the fourth disk unit 41-4.

Referring to FIGS. 5 through 8 in addition to FIGS. 1 through 4, the operation of the disk array apparatus, particularly, the error control method will be described. It is noted here that each of the disk array controller 21 and the temporarily degenerate mode disk array controller 212 achieves the following operation by executing a program preliminarily memorized in a control memory (not shown). The control memory may comprise a semiconductor memory, a magnetic disk such as a flexible disk, and an optical disk.

Figure 5:
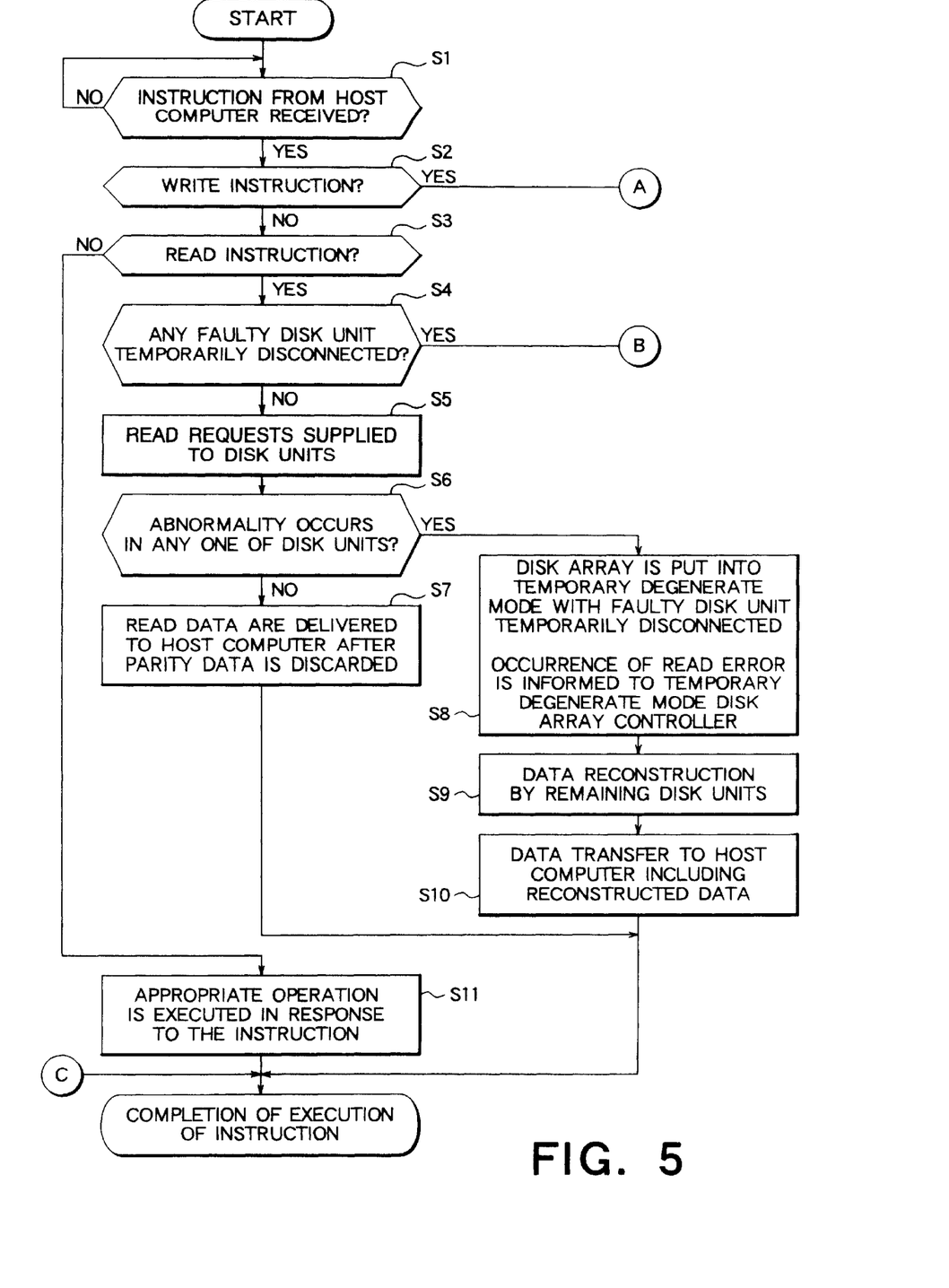
FIG. 5 is a flow chart for describing an operation of the disk array controller illustrated in FIG. 2.

At first, the disk array controller 21 waits for reception of an instruction from the host computer 10 (step S1 in FIG. 5).

Reading Operation

Supplied with the reading instruction from the host computer 10 (No in step S2 and Yes in step S3 in FIG. 5), the disk array controller 21 judges presence or absence of a faulty disk unit temporarily disconnected from the disk array apparatus (step S4 in FIG. 5).

In absence of any faulty disk unit temporarily disconnected (No in step S4), the disk array controller 21 supplies the first through the fourth disk controllers 31-1 through 31-4 with read requests for the first through the fourth disk units 41-1 through 41-4, respectively (step S5 in FIG. 5).

As a consequence, the first through the fourth disk units 41-1 through 41-4 successively read the first data group DG2-1, ((1), (4), (7), . . . , and (x)), the second data group DG2-2, ((2), (5), (8), . . . , and (y)), the third data group DG2-3, ((3), (6), (9), . . . , and (z)), and the fourth data group DG2-4 ((P1-3), (P4-6), (P7-9), . . . , and (Px-z)) as the parity data, respectively. These data groups are delivered to the disk array controller 21 through the first through the fourth disk controllers 31-1 through 31-4.

Supplied with all of these data groups normally (No in step S6 in FIG. 5), the disk array controller 21 discards the fourth data group DG2-4 (F1-3), (P4-6), (P7-9), . . . , and (Px-z) as the parity data and rearranges the first through the third data groups DG2-1 through DG2-3 into the read data (1) through (x) which are delivered to the host computer 10 (step S7 in FIG. 5).

On the other hand, it is assumed here that there is a faulty disk unit (the first disk unit 41-1 by way of example) temporarily disconnected from the disk array apparatus (Yes in step S4 in FIG. 5). In this event, the disk array controller 21 reconstructs the first data group DG2-1 by the help of the remaining disk units 41-2 through 41-4 with the first disk unit 41-1 temporarily disconnected. Then, the read data are reproduced and delivered to the host computer 10 (step S20 in FIG. 7).

Again referring to FIG. 5, it is assumed that an abnormality occurs in a particular one of the first through the fourth disk units 41-1 through 41-4 during the reading operation (Yes in step S6 in FIG. 5). In this event, the disk array controller 31 temporarily disconnects the particular disk unit from the disk array apparatus as a faulty disk unit and notifies occurrence of the abnormality in the reading operation to the temporary degenerate mode disk array controller 312 (step S8 in FIG. 5).

In case where the abnormality occurs in the first disk unit 41-1 by way of example, the disk array controller 21 can not receive the first data group DG2-1 ((1), (4), (7), . . . , and (x)) from the first disk unit 41-1.

In this event, the disk array controller 21 acquires the second data group DG2-2 ((2), (5), (8), . . . , and (y)), the third data group DG2-3 ((3), (6), (9), . . . , and (z)), and the fourth data group DG2-4 ((P1-3), (P4-6), (P7-9), . . . , and (Px-z)) as the parity data from the second, the third, and the fourth disks units 41-2, 41-3, and 41-4, respectively, to reconstruct the first data group DG2-1 ((1), (4), (7), . . . , and (x)) for the first disk unit 41-1 (step S9 in FIG. 5).

Specifically, the read data (1) are reconstructed from the read data (2) and (3) and the parity data (P1-3). The read data (4) are reconstructed from the read data (5) and (6) and the parity data (P4-6). The read data (7) are reconstructed from the read data (8) and (9) and the parity data (P7-9). The read data (10) are reconstructed from the read data (11) and (12) and the parity data (P10-12). Similarly, the read data are successively reconstructed until the data (x) are finally reconstructed from the read data (v) and (w) and the parity data (Px-z). Then, the read data (1) through (z) are delivered to the host computer 10 (step S10 in FIG. 10).

Supplied from the disk array controller 21 with the information of occurrence of the abnormality in the reading operation (Yes in step S21 in FIG. 8), the temporary degenerate mode disk array controller 212 executes retry of the reading operation upon the first disk unit 41-1 (step S22 in FIG. 8) in parallel to the operation of the disk array controller 21. If the retry is not normally completed (No in step S23 in FIG. 8), stored data stored at a faulty position where the abnormality has occurred are rewritten by reconstructed data reconstructed from other stored data stored in the remaining disk units 41-2 through 41-4 as described above (step S26 in FIG. 8).

Figure 8:
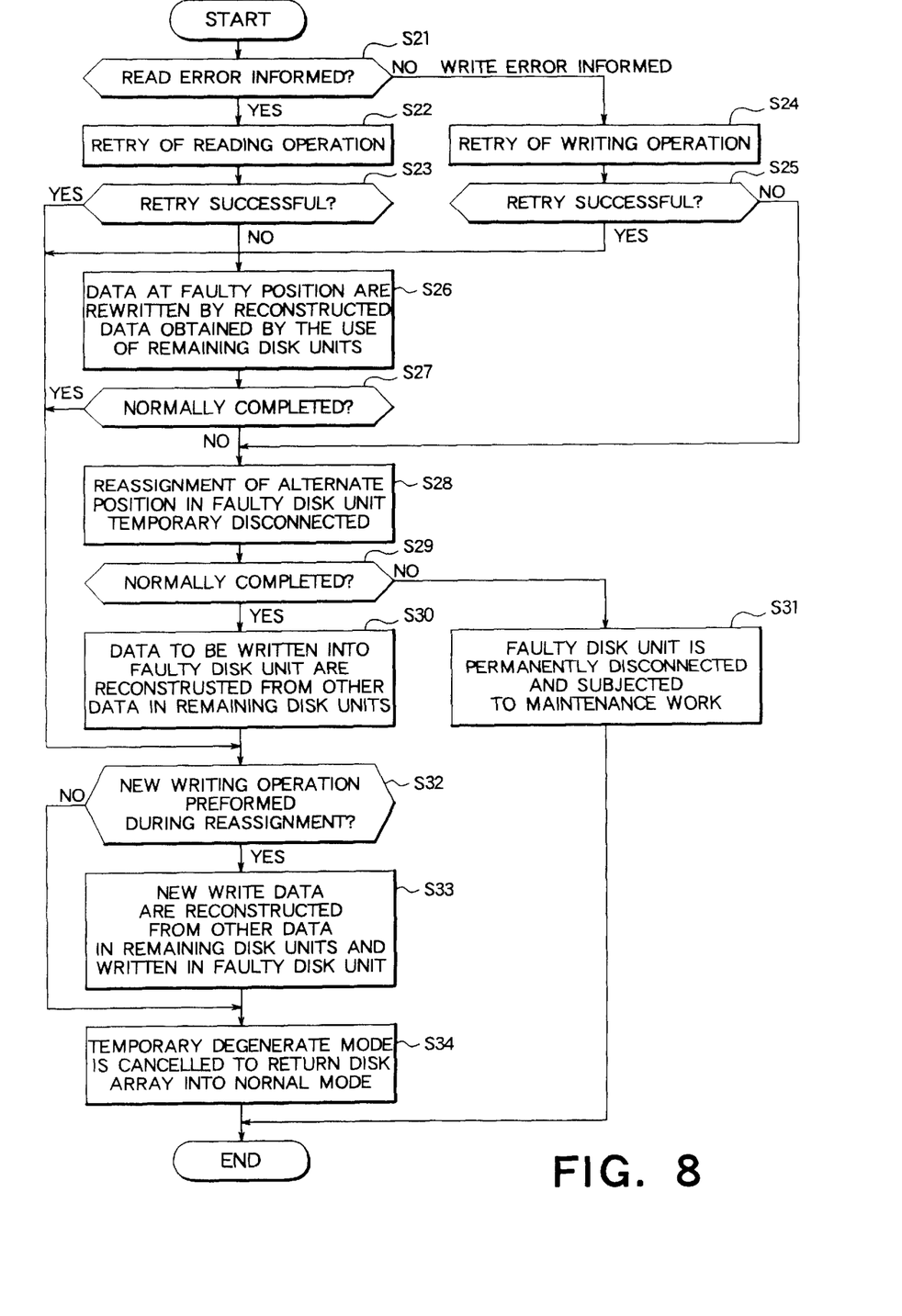
FIG. 8 is a flow chart for describing an operation of a temporary degenerate mode disk array controller illustrated in FIG. 2.

If this rewriting is not normally completed (No in step S27 in FIG. 8), the temporary degenerate mode disk array controller 212 requests the first disk unit 41-1 as the faulty disk unit to assign an alternate position in a spare region (not shown) within the first disk unit 41-1 and inhibits the subsequent use of the faulty position to prevent occurrence of another abnormality at the same position (step S28 in FIG. 8).

If the above-mentioned operation is normally completed (Yes in step S29 in FIG. 8), the temporary degenerate mode disk array controller 212 writes the reconstruction data reconstructed as mentioned above into the first disk unit 41-1 at the alternate position (step S30 in FIG. 8). The above-mentioned operation by the temporary degenerate mode disk array controller 212 requires a long time and may not be completed before a new instruction is supplied from the host computer 10. In this event, the above-mentioned operation is executed in parallel to the processing of the new instruction by the disk array controller 21.

Writing Operation

Figure 6:
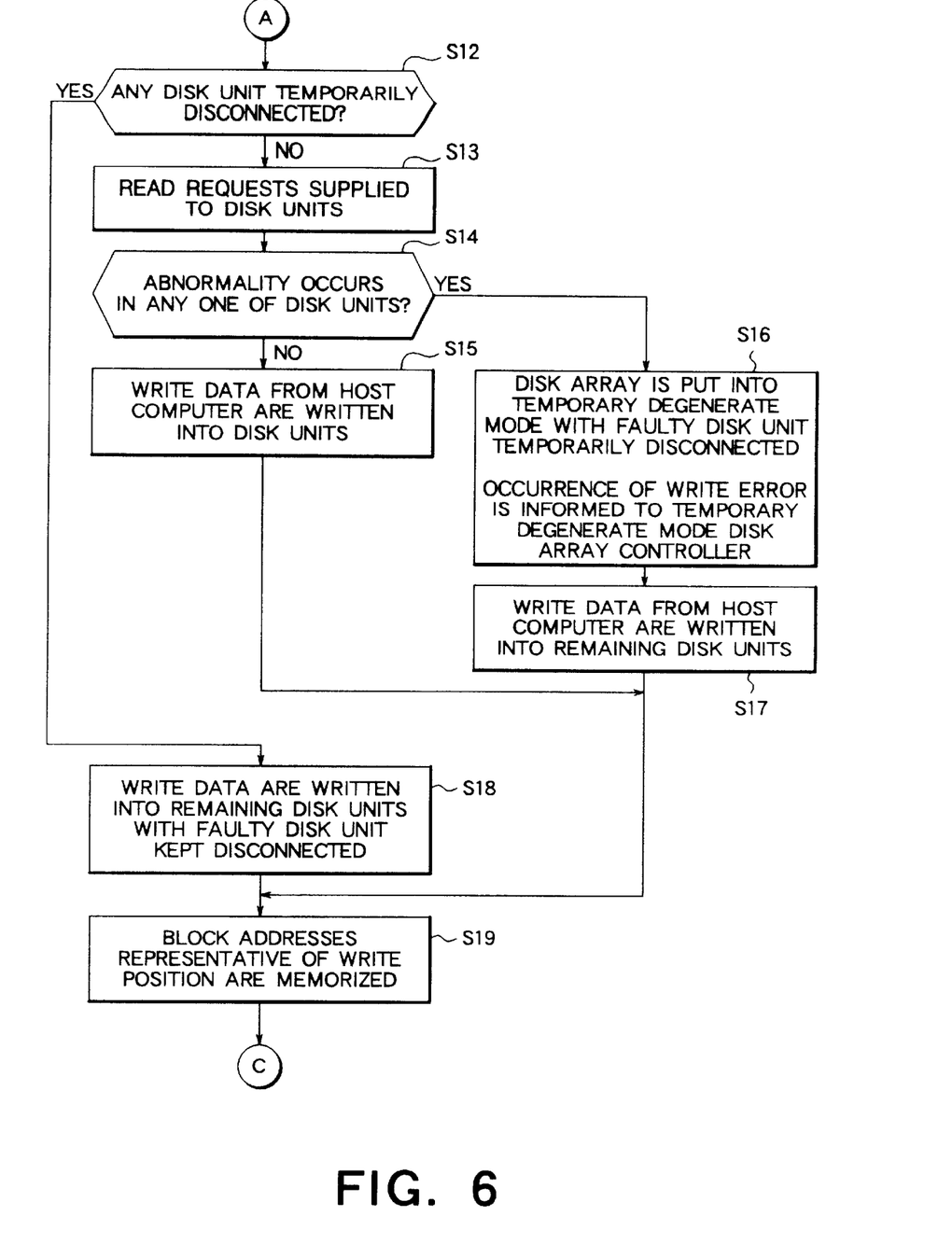
FIG. 6 is another flow chart for describing an operation of the disk array controller illustrated in FIG. 2.
Figure 7:
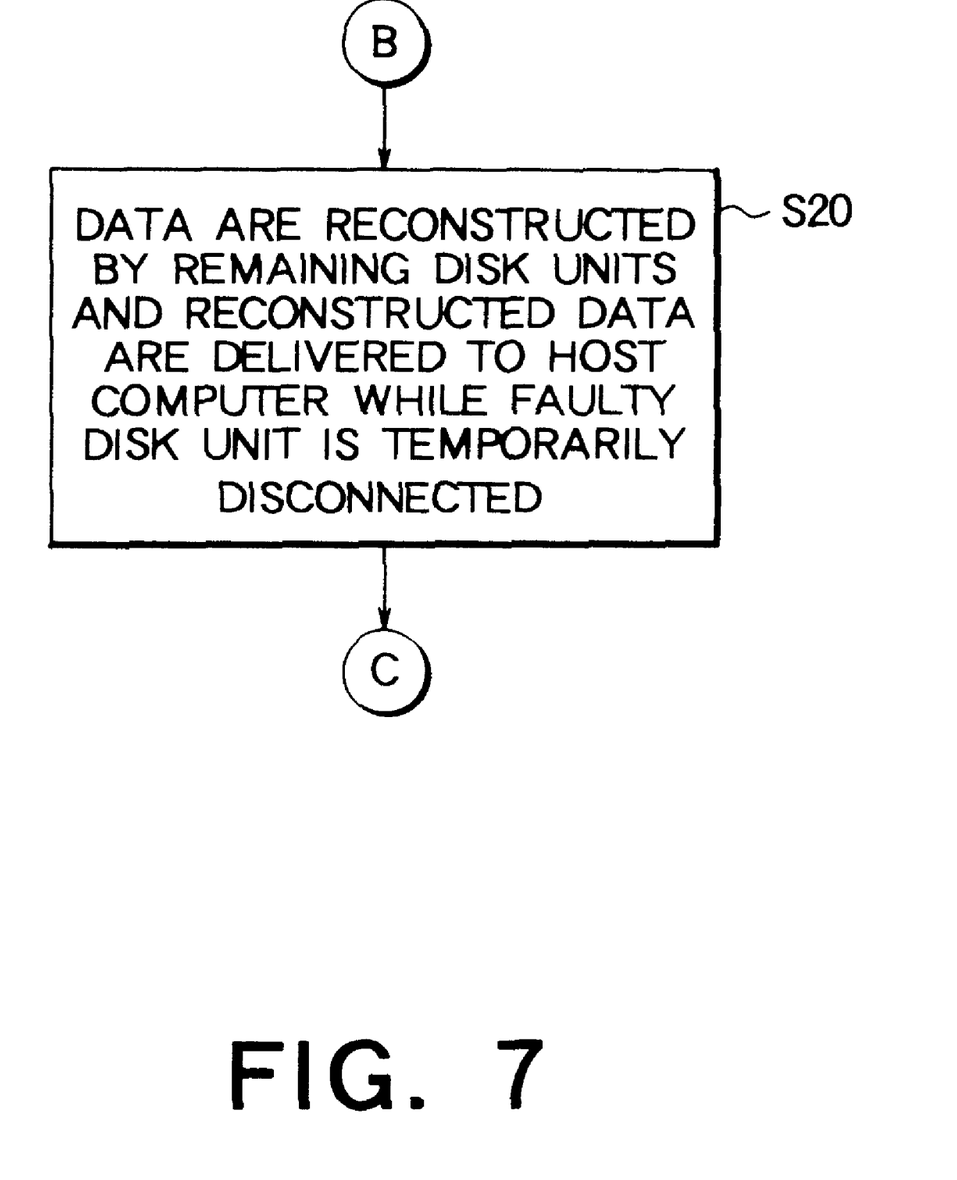
FIG. 7 is still another flow chart for describing an operation of the disk array controller illustrated in FIG. 2.

Supplied from the host computer 10 with the writing instruction (Yes in step S2 in FIG. 5), the disk array controller 21 judges presence or absence of a faulty disk unit temporarily disconnected (step S12 in FIG. 6).

In absence of any faulty disk unit temporarily disconnected (No in step S12), the disk array controller 21 supplies the first through the fourth disk controllers 31-1 through 31-4 with write requests for the first through the fourth disk units 41-1 through 41-4, respectively (step S13 in FIG. 6).

Simultaneously, the disk array controller 21 receives the write data (1) through (z) from the host computer 10 and distribute the write data (1) through (z) and the parity data to the first through the fourth disk controllers 31-1 through 31-4 as the first through the fourth data groups DG1-1 through DG1-4. Specifically, the first data group DG1-1 ((1), (4), (7), . . . , and (x)), the second data group DG1-2 ((2), (5), (8), . . . , and (y)), the third data group DG1-3 ((3), (6), (9), . . . , and (z)), and the fourth data group (P1-3), (P4-6), (P7-9), . . . , and (Px-z) as the parity data are supplied to the first through the fourth disk controllers 31-1 through 31-4, respectively.

These data groups are written into the first through the fourth disk units 41-1 through 41-4 under control of the first through the fourth disk controllers 31-1 through 31-4, respectively. Within each of the disk units, a data managing region (typically called an ID region) is read prior to the writing operation.

If no abnormality occurs when the data managing region is read (No in step S14 in FIG. 6), the disk array controller 21 makes the first through the fourth disk controllers 31-1 throug 31-4 write the write data from the host computer 10 and the parity data into the first through the fourth disk units 41-1 through 41-4 (step S15 in FIG. 6).

If there is a faulty disk unit (the first disk unit 41-1 by way of example) temporarily disconnected from the disk array apparatus (Yes in step S12 in FIG. 6), the disk array controller 21 writes the write data from the host computer 10 and the parity data into the remaining disk units 41-2 through 41-4 with the first disk unit 41-1 temporarily disconnected (step S18 in FIG. 6).

At this time, the disk array controller 21 informs the temporary degenerate mode disk array controller 212 of the fact that the writing operation is performed in presence of the faulty disk unit temporarily disconnected. Simultaneously, the disk array controller 21 memorizes write positions as block addresses at which the writing operation is performed (step S19 in FIG. 6).

On the other hand, if an abnormality occurs when the data managing region is read (Yes in step S14 in FIG. 6), the disk array controller 21 temporarily disconnects the first disk unit 41-1 as the faulty disk unit. Simultaneously, the disk array controller 21 informs the temporary degenerate mode disk array controller 212 of the occurrence of the abnormality during the writing operation (step S16 in FIG. 6).

For example, if the abnormality occurs in the first disk unit 41-1, the disk array controller 21 can not write the first data group DG1-1 ((1), (4), (7), ..., and (x)) into the first disk unit 41-1.

Then, the disk array controller 21 writes the second data group DG1-2 ((2), (5), (8), ..., and (y)), the third data group DG1-3 ((3), (6), (9), ..., and (z)), the fourth data group DG1-4 ((P1-3), (P4-6), (P7-9), ..., and (Px-z)) as the parity data into the second through the fourth disk units 41-2, 41-3, and 41-4, respectively (step S17 in FIG. 6).

Supplied from the disk array controller 21 with the information of occurrence of the abnormality during the writing operation (No in step S21 in FIG. 8), the temporary degenerate mode disk array controller 212 executes retry of the writing operation in parallel to the operation of the disk array controller 21 (step S24 in FIG. 8). If the retry is not normally successful (No in step S25 in FIG. 8), the temporary degenerate mode disk array controller 212 requests the first disk unit 41-1 as the faulty disk unit to assign the alternate position in the spare region (not shown) within the first disk unit 41-1 and inhibits the subsequent use of the faulty position to prevent occurrence of another abnormality at the same position (step S28 in FIG. 8).

If the above-mentioned operation is normally completed (Yes in step S29 in FIG. 8), the temporary degenerate mode disk array controller 212 writes the reconstructed data reconstructed from the stored data stored in the remaining disk units 41-2 through 41-4 into the first disk unit 41-1 at the alternate position (step S30 in FIG. 8). The above-mentioned operation by the temporary degenerate mode disk array controller 212 requires a long time and may not be completed before a new instruction is supplied from the host computer 10. In this event, the above-mentioned operation is executed in parallel to the processing of the new instruction by the disk array controller 21.

Then, if execution of the new writing operation during assignment of the alternate position is informed from the disk array controller 21 (Yes in step S32 in Fig. 8), the temporary degenerate mode disk array controller 212 reads the stored data from the remaining disk units 41-2 through 41-4 to obtain the reconstruction data, and successively writes the reconstructed data into the first disk unit 41-1 at the block addresses memorized as described above (step S33 in FIG. 8).

At the time when the above-mentioned writing operation is completed, the disk array controller 21 cancels the temporary degenerate mode to return the disk array apparatus into the normal mode (step S34 in FIG. 8). Then, the entire process comes to an end.

When the internal processing such as the assignment of the alternate position in the faulty disk unit is not normally completed (No in step S29 in FIG. 8), the temporary degenerate mode disk array controller 212 permanently disconnects the faulty disk unit and requests maintenance work, such as repair and exchange, of the faulty disk unit (step S31 in FIG. 8).

If the new instruction from the host computer 10 is neither the reading instruction nor the writing instruction (No in steps S2 and S3 in FIG. 5), an appropriate operation corresponding to the new instruction is executed (step S11 in FIG. 5) to complete the instruction execution process.

As described above, the faulty disk unit is temporary disconnected upon occurrence of the abnormality to put the disk array apparatus into the temporary degenerate mode. In the temporary degenerate mode, the normal operation is still continued between the disk array apparatus and the host computer while the alternate position is assigned as the internal processing within the disk unit. Thereafter, the data reconstruction is automatically carried out and the disk array apparatus is automatically returned to the normal mode. Thus, a sufficient retry time is reserved to achieve a stable operation while the disk array apparatus assures a short response time.

Second Embodiment

Figure 9:
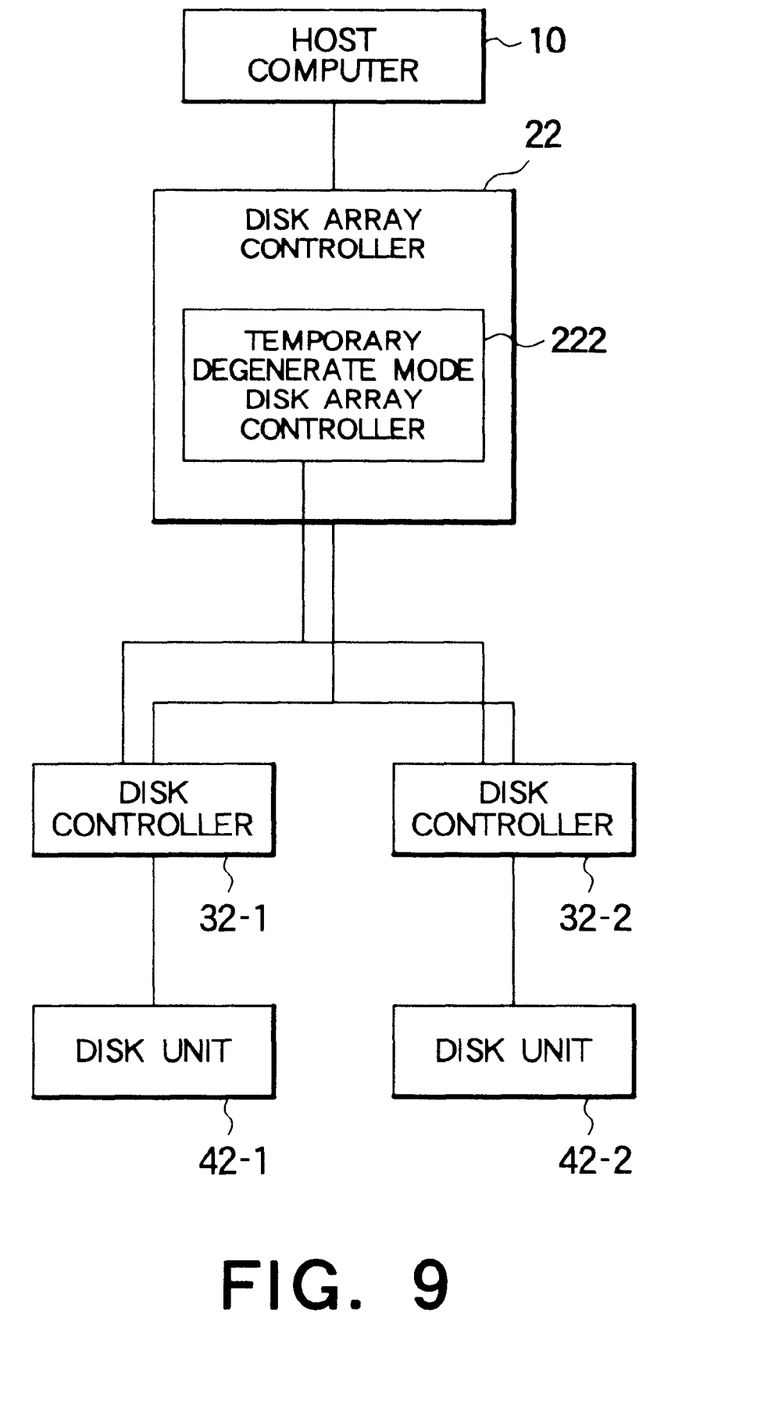
FIG. 9 is a block diagram of a disk array apparatus according to a second embodiment of this invention.

Referring to FIG. 9, a disk array apparatus according to a second embodiment of this invention comprises a disk array controller 22 including a temporary degenerate mode disk array controller 222, first and second disk controllers 32-1 and 32-2, and first and second disks units 42-1 and 42-2. The disk array apparatus has a RAID-1 configuration. Specifically, same data are written in each of the first and the second disk units 42-1 and 42-2 which cooperatively provide a redundancy. One and the other of the disk units 42-1 and 42-2 are used as a data storage and a parity storage. Thus, this embodiment is recognized as a simplest version of the first embodiment in which the parity is given to a plurality of the disk units. The error control method according to the second embodiment is performed in the manner similar to the first embodiment and will not be described any longer.

Third Embodiment

Figure 10:
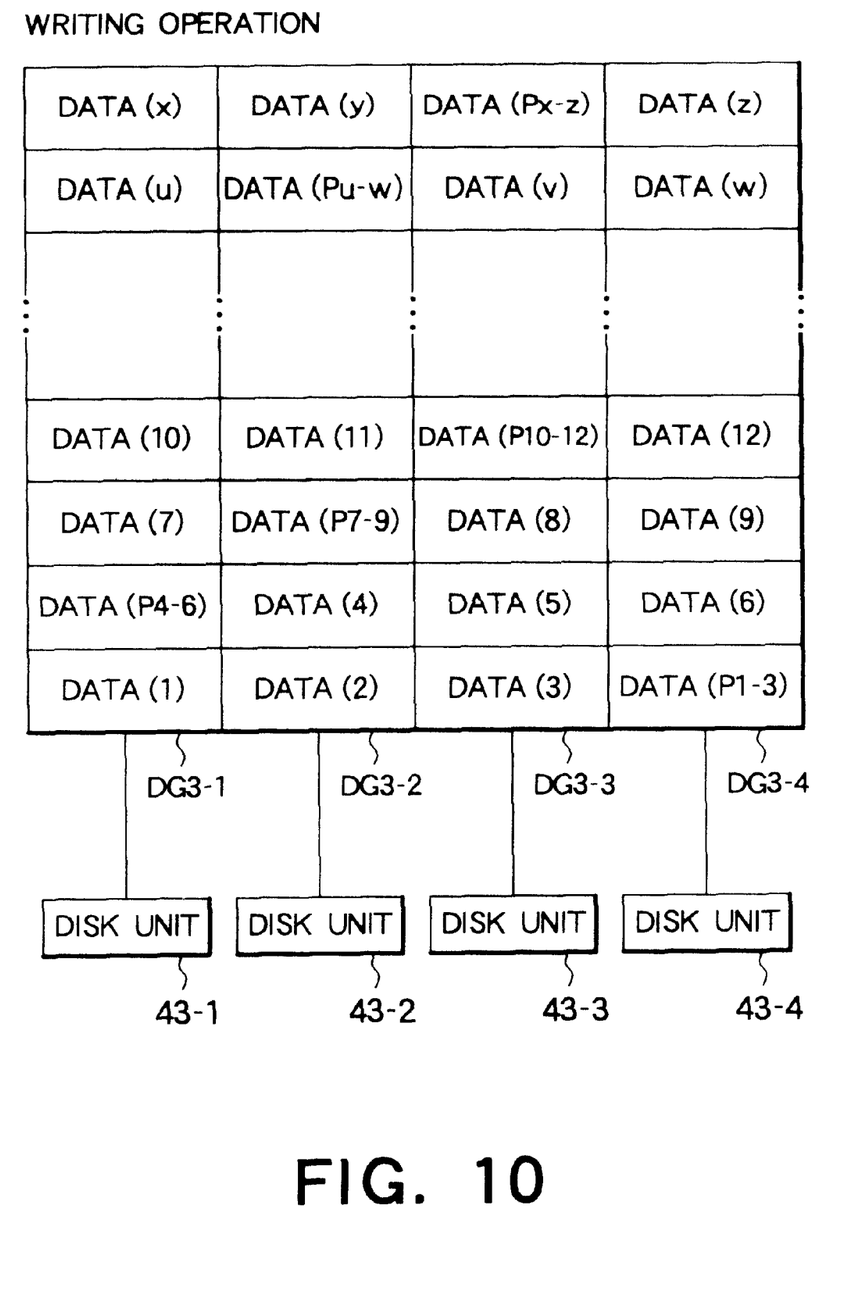
FIG. 10 is a view for describing data preparation during a data writing operation in a disk array apparatus according to a third embodiment of this invention.
Figure 11:
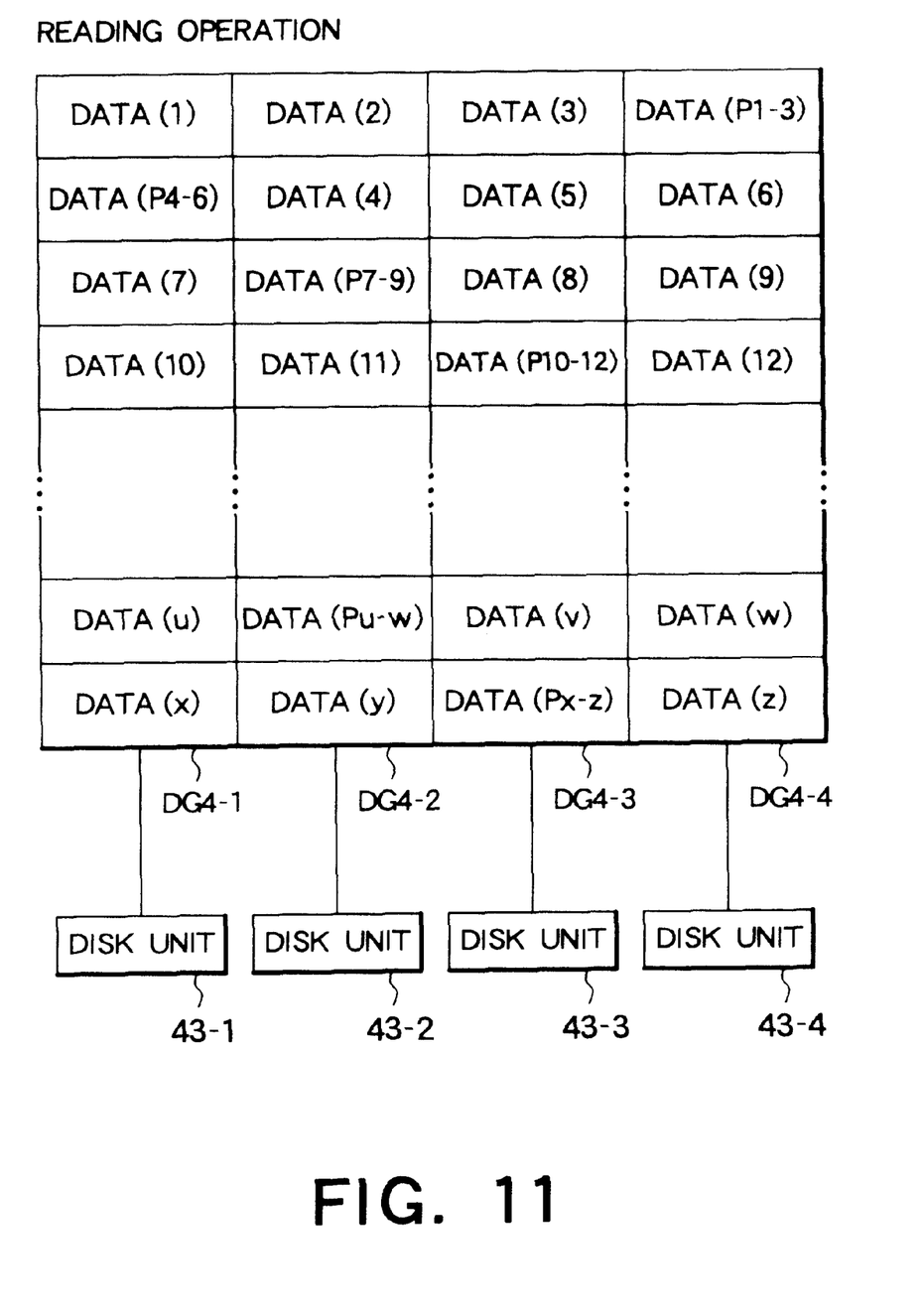
FIG. 11 is a view for describing data reproduction during a reading operation in the disk array apparatus according to the third embodiment of this invention.

Referring to FIGS. 10 and 11, a disk array apparatus according to a third embodiment of this invention has a RAID-5 configuration and comprises first through fourth disk units 43-1 through 43-4 which cooperatively provide a redundancy. In this embodiment, a disk unit to which parity data are to be written is not fixed. The first through the fourth disk units 43-1 through 43-4 are alternately loaded with parity data. The error control method according to the third embodiment is performed in the manner similar to the first embodiment and will not be described any longer.

In the first through the third embodiments, description is directed to the disk array apparatuses of the RAID-3, the RAID-1, and the RAID-5 configurations. However, this invention is also applicable to any disk array apparatus comprising a plurality of disk units arranged to have a redundancy. For example, the disk array apparatus may have a RAID-2 or a RAID-4 configuration.

In this invention, the abnormality in the writing operation or the reading operation is detected and the information identifying the faulty disk unit is recorded.

The faulty disk unit is temporarily disconnected and the disk array apparatus is operated in the temporary degenerate mode. When the new writing instruction or the new reading instruction is supplied from the host computer during the temporary degenerate mode, the remaining disk units other than the faulty disk unit are made to perform the new writing operation or the new reading operation by the use of the redundancy. In parallel to the new writing operation or the new reading operation, the retry in the faulty disk unit is performed. Thus, the abnormality in the writing/reading operation of the disk unit can be dealt with without delaying the principal operation of the disk array apparatus. In addition, it is possible to prevent the disk array apparatus from being undesiredly put into the temporary degenerate mode with the normal disk unit disconnected from the disk array apparatus. Thus, the stable operation can be continued.

What is claimed is:

1. A disk array apparatus which comprises a plurality of disk units so as to have a redundancy and which carries out, in response to a data writing instruction or a data reading instruction from a host computer, a data writing operation or a data reading operation between the disk units of said disk array apparatus and said host computer in a normal mode, said disk array apparatus comprising:

- detecting means for detecting, as a faulty unit, one of said disk units in which an abnormality occurs on any one of said data writing operation and said data reading operation;
- memorizing means for memorizing information indicative of said faulty unit;
- disconnecting managing means for managing disconnection of said faulty unit by temporarily disconnecting said faulty unit as a temporarily disconnected unit to make said disk array apparatus operate in a temporary degenerate mode;
- instruction-execution controlling means for controlling instruction-execution to force the disk units except said temporarily disconnected unit to execute the data writing operation or the reading operation between the disk units except said temporarily disconnected unit and said host computer by the use of said redundancy when said disk array apparatus receives, during said temporary degenerate mode, the data writing instruction or the data reading instruction from said host computer; and
- retry means for carrying out retry for said temporarily disconnected unit in parallel to the data writing operation or the data reading operation executed between the disk units except said temporarily disconnected unit and said host computer.

2. A disk array apparatus as claimed in claim 1, further comprising reentry means for carrying out reentry of said temporarily disconnected unit by canceling, when said temporarily disconnected unit is normal as the result of the retry by said retry means, temporary disconnection of said temporarily disconnected unit to return said disk array apparatus from said temporary degenerate mode into said normal mode.

3. A disk array apparatus as claimed in claim 1, wherein said detecting means detects, as said faulty unit, said one of the disk units when said detecting means is informed of occurrence of said abnormality from said one of the disk units or when said detecting means detects a time-out event such that said one of the disk units fails to respond to the data writing instruction or the data reading instruction from said host computer within a predetermined time period.

4. A disk array apparatus as claimed in claim 1, wherein said retry means carries out the retry for said temporarily disconnected unit by making said temporarily disconnected unit again execute the data writing operation or the data reading operation, which has been executed upon occurrence of said abnormality, to confirm whether or not said abnormality again occurs and to record the occurrence of said abnormality without performing any other processing when said abnormality does not again occur.

5. A disk array apparatus as claimed in claim 1, wherein said retry means carries out the retry for said temporarily disconnected unit by rewriting data stored at a position of said temporarily disconnected unit where said abnormality has occurred, so as to recover a state such that said data is normally read.

6. A disk array apparatus as claimed in claim 1, wherein said retry means also carries out, when said abnormality is a reading error resulting from a physical defect of a particular position of said temporarily disconnected unit, a reassignment to assign an alternate position of said temporarily disconnected unit with inhibition of the use of the particular position of said temporarily disconnected unit.

7. A disk array apparatus as claimed in claim 1, wherein said instruction-execution controlling means not only forces the disk units except said temporarily disconnected unit to execute the data writing operation of writing data by the use of said redundancy when said disk array apparatus receives, during said temporary degenerate mode, the data writing instruction from said host computer but also memorizes block addresses indicative of writing positions at which said writing data should originally be written in said temporarily disconnected unit, said instruction-execution controlling means restoring data of said temporarily disconnected unit into updated data on the basis of said block addresses memorized before cancellation of temporary disconnection of said temporarily disconnected unit and write data written in the disk units except said temporarily disconnect in correspondence to the writing positions of said block addresses.

8. A disk array apparatus as claimed in claim 1, wherein said disconnection managing means temporarily disconnects as said temporarily disconnected unit a part of said faulty unit including a data recording position (or a block address) of said faulty unit at which the abnormality occurs.

9. A disk array apparatus as claimed in claim 1, wherein said disk array apparatus has any one of RAID-1 (Redundant Array of Inexpensive Disks-1) through RAID-5 (Redundant array of Inexpensive Disks-5) configurations.

10. An abnormality control method for use in a disk array apparatus which comprises a plurality of disk units so as to have a redundancy and which carries out, in response to a data writing instruction or a data reading instruction from a host computer, a data writing operation or a data reading operation between the disk units of said disk array apparatus and said host computer in a normal mode, said abnormality control method comprising:

- a detecting step of detecting, as a faulty unit, one of said disk units in which an abnormality occurs on said data writing operation or said data reading operation;
- a memorizing step of memorizing information indicative of said faulty unit;
- a disconnection managing step of managing disconnection of said faulty unit by temporarily disconnecting said faulty unit as a temporarily disconnected unit to make said disk array apparatus operate in a temporary degenerate mode;
- an instruction-execution controlling step of controlling instruction-execution to force the disk units except said temporarily disconnected unit to execute the data writing operation or the reading operation between the disk units except said temporarily disconnected unit and said host computer by the use of said redundancy when said disk array apparatus receives, during said temporary degenerate mode, the data writing instruction or the data reading instruction from said host computer; and
- a retry step of carrying out retry for said temporarily disconnected unit in parallel to the data writing operation or the data reading operation executed between the disk units except said temporarily disconnected unit and said host computer.

11. An abnormality control method as claimed in claim 10, further comprising a reentry step of carrying out reentry of said temporarily disconnected unit by canceling, when said temporarily disconnected unit is normally as the result of the retry by said retry step, temporary disconnection of said temporarily disconnected unit to return said disk array apparatus from said temporary degenerate mode into said normal mode.

12. An abnormality control method as claimed in claim 10, wherein said detecting step detects, as said faulty unit, said one of the disk units when said detecting step is informed of occurrence of said abnormality from said one of the disk units or when said detecting step detects a time-out event such that said one of the disk units fails to respond to the data writing instruction or the data reading instruction from said host computer within a predetermined time period.

13. An abnormality control method as claimed in claim 10, wherein said retry step carries out the retry for said temporarily disconnected unit by making said temporarily disconnected unit again execute the data writing operation or the data reading operation, which has been executed upon occurrence of said abnormality, to confirm whether or not said abnormality again occurs and to record the occurrence of said abnormality without performing any other processing when said abnormality does not again occur.

14. An abnormality control method as claimed in claim 10, wherein said retry step carries out the retry for said temporarily disconnected unit by rewriting data stored at a position of said temporarily disconnected unit where said abnormality has occurred, so as to recover a state such that said data is normally read.

15. An abnormality control method as claimed in claim 10, wherein said retry step also carries out, when said abnormality is a reading error resulting from a physical defect of a particular position of said temporarily disconnected unit, a reassignment to assign an alternate position of said temporarily disconnected unit with inhibition of the use of the particular position of said temporarily disconnected unit.

16. An abnormality control method as claimed in claim 10, wherein said instruction-execution controlling step not only forces the disk units except said temporarily disconnected unit to execute the data writing operation of writing data by the use of said redundancy when said disk array apparatus receives, during said temporary degenerate mode, the data writing instruction from said host computer but also memorizes block addresses indicative of writing positions at which said writing data should originally be written in said temporarily disconnected unit, said instruction-execution controlling step restoring data of said temporarily disconnected unit into updated data on the basis of said block addresses memorized before cancellation of temporary disconnection of said temporarily disconnected unit and write data written in the disk units except said temporarily disconnect in correspondence to the writing positions of said block addresses.

17. An abnormality control method as claimed in claim 10, wherein said disconnection managing step temporarily disconnects as said temporarily disconnected unit a part of said faulty unit including a data recording position (or a block address) of said faulty unit at which the abnormality occurs.

18. An abnormality control method as claimed in claim 10, wherein said disk array apparatus has any one of RAID-1 (Redundant Array of Inexpensive Disks-1) through RAID-5 (Redundant Array of Inexpensive Disks-5) configurations.

19. A recording medium which records a control program for executing the abnormality control method described in claim 10.

20. An abnormality control method for use in a disk array apparatus which comprises a plurality of disk units so as to have a redundancy and which carries out, in response to a data writing instruction or a data reading instruction from a host computer, a data writing operation or a data reading operation between the disk units of said disk array apparatus and said host computer in a normal mode, said abnormality control method comprising the steps of:

making, when an abnormality occurs in a particular unit of said disk units, said disk array apparatus operate temporarily in a temporary degenerate mode using all of the disk units except said particular unit; and carrying out retry for said particular unit while said disk array apparatus operates in the temporary degenerate mode using all of the disk units except said particular unit.

21. An abnormality control method as claimed in claim 20, further comprising the step of making, when said abnormality of said particular unit is removed as the result of said retry, said disk array apparatus operate in said normal mode by canceling operation in said temporary degenerate mode.

22. An abnormality control method as claimed in claim 20, further comprising the step of carry out, when said abnormality is an error resulting from a physical defect of a particular position of said particular unit, a reassignment to use other positions of said particular unit except said particular position.

23. An abnormality control method as claimed in claim 20, wherein said disk array apparatus has any one of RAID-1 (Redundant Array of Inexpensive Disks-1) through RAID-5 (Redundant Array of Inexpensive Disks-5) configurations.

24. A recording medium which records a control program for executing the abnormality control method described in claim 20.

* * * * *